United States Patent
Jiang et al.

(10) Patent No.: US 9,118,903 B2
(45) Date of Patent: Aug. 25, 2015

(54) DEVICE AND METHOD FOR 2D TO 3D CONVERSION

(75) Inventors: Jian-De Jiang, Xian (CN); Heng Yu, Shanghai (CN)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 324 days.

(21) Appl. No.: 13/559,266

(22) Filed: Jul. 26, 2012

(65) Prior Publication Data

US 2013/0027396 A1    Jan. 31, 2013

(30) Foreign Application Priority Data

Jul. 28, 2011    (CN) .......................... 2011 1 0213228

(51) Int. Cl.
*G06T 15/00* (2011.01)
*H04N 13/02* (2006.01)
*H04N 13/00* (2006.01)

(52) U.S. Cl.
CPC ............. *H04N 13/026* (2013.01); *H04N 13/00* (2013.01); *H04N 13/0022* (2013.01)

(58) Field of Classification Search
None
See application file for complete search history.

(56) References Cited

U.S. PATENT DOCUMENTS

| | | | | |
|---|---|---|---|---|
| 5,315,377 | A * | 5/1994 | Isono et al. | 348/51 |
| 6,590,573 | B1 * | 7/2003 | Geshwind | 345/419 |
| 7,035,451 | B2 * | 4/2006 | Harman et al. | 382/154 |
| 2011/0157155 | A1 * | 6/2011 | Turner et al. | 345/419 |

FOREIGN PATENT DOCUMENTS

| | | |
|---|---|---|
| CN | 102036081 A | 4/2011 |
| WO | WO 2010-116614 A1 | 10/2010 |

OTHER PUBLICATIONS

P. Kauff et al.; "Depth map creation and image-based rendering for advanced 3DTV services providing interoperability and scalability;" Signal Processing: Image Communication 22 (2007) 217-234; Elsevier B.V.; Mar. 2007; pp. 217-234.*
Zhang et al.;"Stereoscopic Image Generation Based on Depth Images for 3D TV;" IEEE Transactions on Broadcasting, vol. 51, No. 2, Jun. 2005; pp. 191-199.*
Taiwanese Office Action dated Oct. 29, 2014.

* cited by examiner

*Primary Examiner* — Edward Martello
(74) *Attorney, Agent, or Firm* — Rabin & Berdo, P.C.

(57) ABSTRACT

A device and method are provided for two dimension (2D) to three dimension (3D) conversion. A 2D to 3D conversion device receives a 2D image data. The 2D to 3D conversion device assigns position data of a predetermined window. The 2D to 3D conversion device generates a depth map including a depth data of the 2D image data according to the 2D image data and the position data of the predetermined window. The 2D to 3D conversion device converts the 2D image data into a 3D image data according to the depth data of the depth map and the position data of the predetermined window.

16 Claims, 3 Drawing Sheets

DEVICE AND METHOD FOR 2D TO 3D CONVERSION

This application claims the benefit of People's Republic of China application Serial No. 201110213228.5, filed Jul. 28, 2011, the subject matter of which is incorporated herein by reference.

BACKGROUND

1. Technical Field

The disclosure relates in general to a device and a method for two dimension (2D) to three dimension (3D) conversion, and more particularly to a device and a method for 2D to 3D conversion implementing partial image conversion.

2. Description of the Related Art

Three dimensional (3D) or stereoscopic TV or display has attracted more and more attentions. In comparison to the conventional two dimensional (2D) or planar image, the 3D image provides superior entertainment effect and visual enjoyment to viewers.

In general, a 2D image may be converted into a 3D image by 2D to 3D conversion which relies on a depth map. Here, "depth" refers to the perceived distance to an object of an image when a viewer views the object, and also refers to the parallax.

Conventionally, a 2D image is converted into a 3D image by way of full screen conversion. However, as for some types of 2D images, such as the video phone frame provided by video phone in a computer, some data, such as a movie, are OK if displayed in stereoscopic but some data, such as the contents of network browser, chat text messages, and texts or buttons of toolbar, are better not displayed in stereoscopic. Meanwhile, if all of the 2D image are converted into 3D data by way of conventional full screen conversion, the 3D image may cause a nuisance to the viewer when the viewer reads texts, and deteriorate the visual effect.

SUMMARY OF THE DISCLOSURE

The disclosure is directed to a device and a method for two dimension (2D) to three dimension (3D) conversion, which converting a 2D image into a 3D image by way of partial conversion.

According to one embodiment of the present disclosure, a 2D to 3D 2D to 3D conversion device is provided. The conversion device includes a data receiver, a user interface, a depth map generator, and an image converter. The data receiver receives a 2D image data. The user interface assigns a position data of a predetermined window. The predetermined window demarcates an image range of the 2D image. The depth map generator generates a depth map including a depth data of the 2D image data according to the 2D image data and the position data of the predetermined window. The image converter converts the 2D image data into a 3D image data according to the depth data of the depth map and the position data of the predetermined window.

According to another embodiment of the present disclosure, a 2D to 3D conversion method is provided. The 2D to 3D conversion device receives a 2D image data. The 2D to 3D conversion device assigns a position data of a predetermined window. The predetermined window demarcates an image range of the 2D image. The 2D to 3D conversion device generates a depth map including a depth data of the 2D image according to the 2D image data and the position data of the predetermined window. The 2D to 3D conversion device converts the 2D image data into a 3D image data according to the depth data of the depth map and the position data of the predetermined window.

According to yet another embodiment of the present disclosure, a 2D to 3D conversion method is provided. A 2D image data is received. A portion of the 2D image data is converted into a 3D image data. The 3D image data and remaining portion of the 2D image data are output.

According to still another embodiment of the present disclosure, a 2D to 3D conversion device is provided. The conversion device includes a data receiver, a user interface, a depth map generator, and an image converter. The data receiver receives a 2D image data. The user interface assignes a portion of the 2D image data. The depth map generator generates a depth map of the 2D image data. The image converter converts the portion of the 2D image data into a 3D image data according to the depth map and outputs the 3D image data and a remaining portion of the 2D image data other than the portion of the 2D image data.

The disclosure will become better understood with regard to the following detailed description of the preferred but non-limiting embodiment(s). The following description is made with reference to the accompanying drawings.

Figure 1:
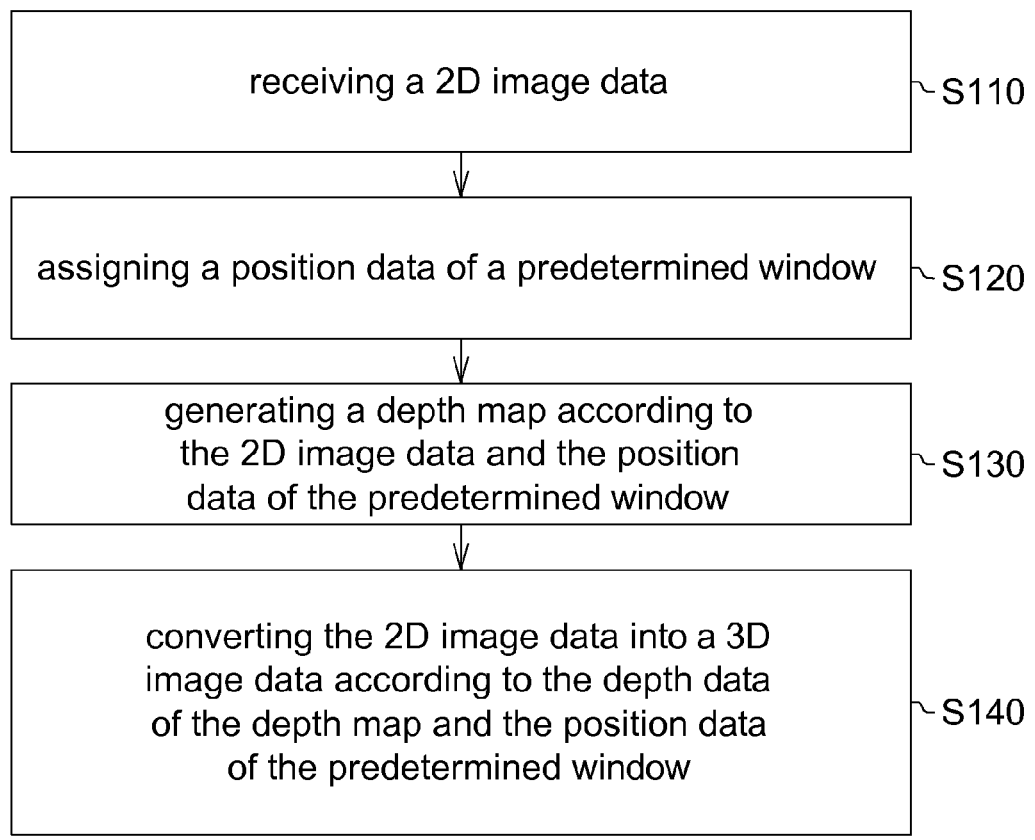
FIG. 1 shows a 2D to 3D conversion method according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

A device and a method for two dimension (2D) to three dimension (3D) conversion are disclosed in a number of embodiments below. In some embodiments, the 2D to 3D conversion device converts a 2D image into a 3D image by way of partial conversion. In other words, a portion of the 2D image is converted and displays stereoscopic effect, and other portion of the 2D image displays planar effect according to predetermined depth data (even after conversion). So that, the viewer may view a 3D image and at the same time read the text data of a 2D image, the visual effect is thus enhanced.

Referring to FIG. 1, a 2D to 3D conversion method according to an embodiment of the disclosure is shown. In step S110, the 2D to 3D conversion device receives 2D image data. In step S120, the 2D to 3D conversion device assigns position data representing a predetermined window which demarcates an image range of the 2D image data. In step S130, the 2D to 3D conversion device generates a depth map including depth data of the 2D image data according to the 2D image data and the position data of the predetermined window. In step S140, the 2D to 3D conversion device converts the 2D image data into 3D image data according to the depth data of the depth map and the position data of the predetermined window. The use of predetermined window makes the 2D to 3D conversion device capable of converting 2D image into 3D image by way of partial conversion so as to enhance the visual effect.

Figure 2:
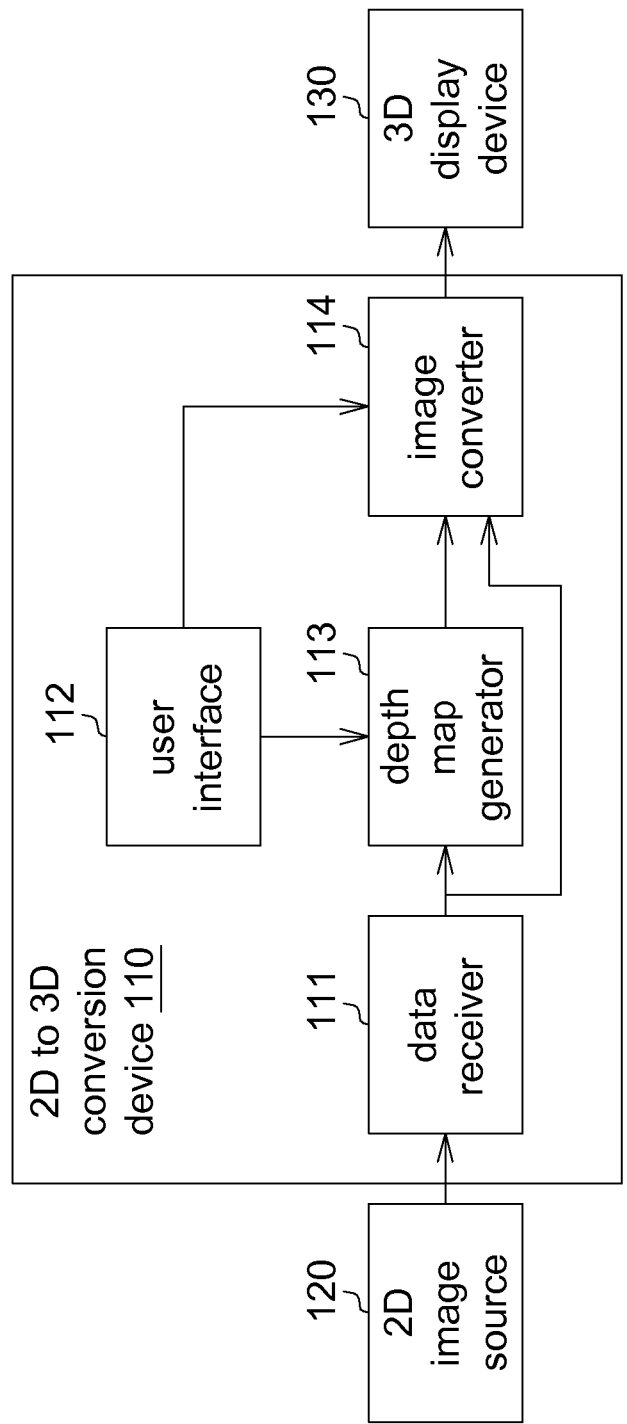
FIG. 2 shows a block diagram of a 2D to 3D conversion device according to an embodiment of the disclosure.

Referring to FIG. 2, a block diagram of a 2D to 3D conversion device according to an embodiment of the disclosure is shown.

A 2D to 3D conversion device 110, a 2D image source 120 and a 3D display device 130 forms a 3D image display system 10. In the present example, the 3D image display system 10 is illustrated for convenience of elaboration. In practical implementation, the 3D image display system 10 may be more complicated, and may include more elements or circuits not illustrated in FIG. 2.

The 2D to 3D conversion device 110 includes a data receiver 111, a user interface 112, a depth map generator 113 and an image converter 114. The elements or circuits of the 2D to 3D conversion device 110 may be realized by software or hardware. The 2D to 3D conversion device 110 converts 2D image data into 3D image data. The 2D to 3D conversion device 110 transmits 3D image data to the 3D display device 130, realized by such as a 3D or stereoscopic TV or display, so as to display 3D image with stereoscopic effect.

The data receiver 111 receives 2D image data. The data receiver 111 is connected to the 2D image source 120, realized by such as a computer or other electronic devices. The data receiver 111 receives from the 2D image source 120, a static image (such as a photo), or a dynamic video.

The user interface 112 assigns position data of the predetermined window. The predetermined window demarcates an image range of 2D image or a partial image range of 2D image. The predetermined window demarcates which portion of 2D image displays in stereoscopic and which portion of 2D image displays in planar.

In some embodiment, the user interface 112 displays a frame for the user to preview and the user selects an image range from the frame. When the user selects an image range, the image data within the image range may be regarded as to be displayed in stereoscopic, and the remaining portion of the image data outside the image range may be regarded as to be displayed in planar.

In some embodiments, the user interface 112 generates corresponding position data of the predetermined window with respect to the selected image range. The position data of the predetermined window includes such as coordinate data of the predetermined window, a central point of the predetermined window or a coverage range of the predetermined window, or any combination thereof. Anyone who is skilled in the technology of the disclosure will understand that the position data of the predetermined window may demarcate the image range by way of several implementations, and the demarcation is not limited to the above exemplification.

The depth map generator 113 is connected to the data receiver 111 and the user interface 112. The depth map generator 113 generates a depth map according to the 2D image data and the position data of the predetermined window.

The depth map includes depth data of 2D image. The depth map is such as an image or an image channel, and depth data of the depth map is also referred as Z-axis data. The depth data represents a distance between the surface of an object (a scene object) and a viewer (a video recorder or a viewer) at a view angle.

In some embodiments, with respect to a portion (or a pixel) of the 2D image data, the depth map generator 113 judges whether this portion of the 2D image data is within the coverage of the predetermined window, and generates a corresponding depth data according to the judgment.

If the portion of the 2D image data is judged as within the predetermined window, the depth map generator 113 may estimate the depth of the portion of the 2D image data. In practical implementation, the depth map generator 113 may estimate the depth data by such as the 2D photo to 3D conversion algorithm, the 2D film to 3D conversion algorithm or the like algorithms. The 2D photo to 3D conversion algorithm recognizes the scene or object of an image by using such as pattern recognition technique. The 2D film to 3D conversion algorithm uses other frame as a reference frame for recognizing the scene or object.

If the portion/pixel of the 2D image data is judged as outside the coverage of the predetermined window, the depth map generator 113 generates a predetermined depth data such as a planar depth data. In other words, with respect to other portion of the 2D image data outside the predetermined window, the depth map generator 113 assigns a depth data, such as zero, which is used for displaying planar image.

By doing so, the portion of the 2D image within the predetermined window displays in stereoscopic, and other part of the 2D image outside the predetermined window displays in planar according to the generated depth data, so as to implement partial 2D to 3D conversion.

In the disclosed embodiments, the depth map generator 113 analyzes or estimates the depth data or depth value of portion(s) or pixels of the 2D image by using various algorithms. However, the disclosure is not limited to the above exemplification. In other embodiments, the depth map generator 113 may receive a depth map of the 2D image from an external source. If so, the depth map generator 113 updates depth data of the depth map corresponding to other portion of the 2D data outside the predetermined window. For example, depth data of other portion(s) of the 2D data outside the predetermined window is updated as a depth data displaying planar effect.

In other embodiments, the depth map generator 113 may estimate the depth data of the whole 2D image. Then, the depth map generator 113 generates a depth map, and filters off (i.e. sets as 0) the depth data corresponding to other portion of the 2D image data outside the predetermined window and maintains the depth data corresponding to the portion of the image data inside the predetermined window.

The image converter 114 is connected to the data receiver 111, the user interface 112, and the depth map generator 113. The image converter 114 converts the 2D image into 3D image data in part or in whole according to the depth data of the depth map and the position data of the predetermined window.

In some embodiment, the image converter 114, such as a depth-image-based rendering (DIBR) converter, generates at lest one displacement image obtained by displacing the original 2D image. For example, the image converter 114 generates two images (left eye image and right eye image), or generates plural images of different view angles for the 3D display device 130 to generate a 3D image displaying stereoscopic effect.

Thus, 2D image data within the predetermined window in conjunction with depth data displays stereoscopic effect, and 2D image data outside the predetermined window in conjunction with predetermined depth data displays planar effect. The partial conversion for converting a 2D image into a 3D image makes the viewer capable of viewing a 3D image and at the same time conveniently reading the text data of the 2D image so as to enhance the visual effect.

For example, the computer displays a video phone frame from a video phone program. Normally, the display frame has a window displaying the video contents of the video phone, and also includes an area surrounding the window which displays data, such as the contents of network browser, chat text messages, and texts or buttons of toolbar, with planar effect. Meanwhile, if the whole 2D image is converted into 3D data, the visual effect will deteriorate. According to the partial conversion, the predetermined window is used for demarcating the image range displaying stereoscopic effect, so that the viewer may view the video contents displayed with stereoscopic effect and conveniently read the text data displayed with planar effect.

Figure 3:
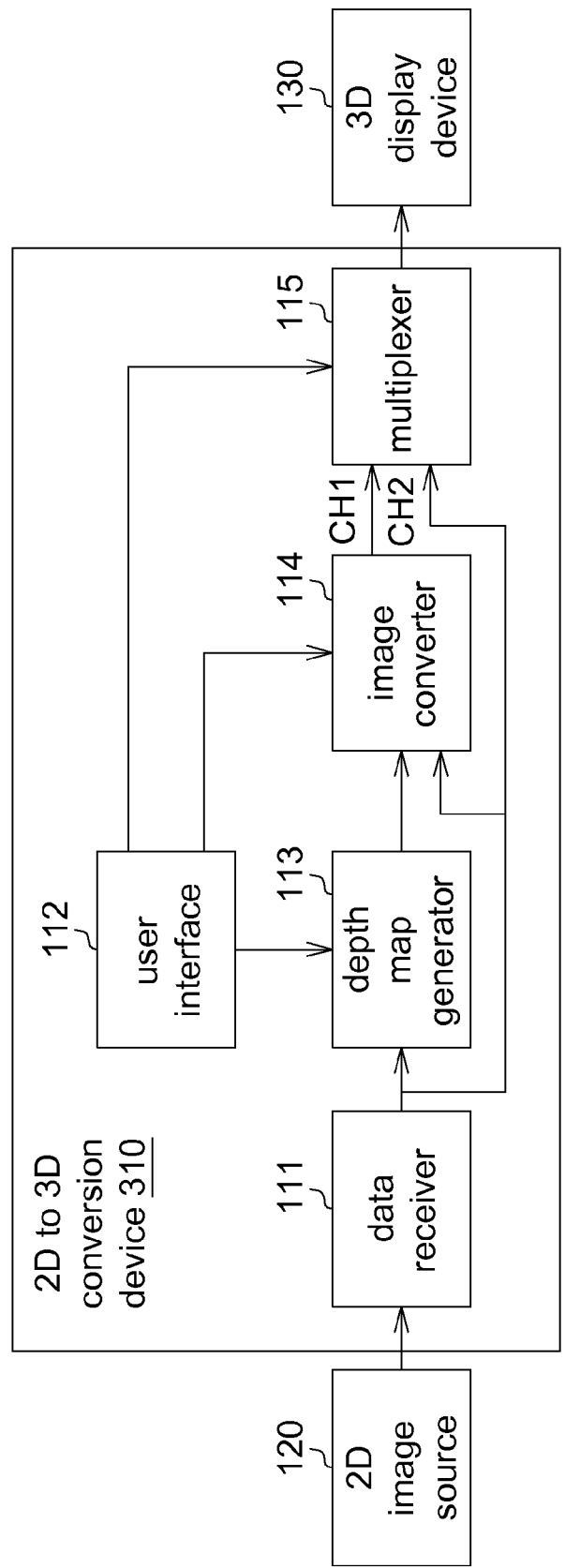
FIG. 3 shows a block diagram of a 2D to 3D conversion device according to another embodiment of the disclosure.

Referring to FIG. 3, a block diagram of a 2D to 3D conversion device according to another embodiment of the disclosure is shown.

A 2D to 3D conversion device 300 of a 3D image display system 30 is different from the 2D to 3D conversion device 110 in that the 2D to 3D conversion device 300 further includes a multiplexer 115. The multiplexer 115 makes the 2D to 3D conversion device 300 of the present embodiment of the disclosure more flexible and provides more convenience to the user.

The multiplexer 115 is connected to the data receiver 111, the user interface 112 and the image converter 114. The multiplexer 115, under the control of the user interface 112, selectively outputs 2D image data or 3D image data.

For example, the multiplexer 115 selects partial conversion or whole conversion of 2D image data according to the position data of the predetermined window. If partial conversion, then the multiplexer 115 outputs the signal of a channel CH1. If whole (full screen) conversion, then the multiplexer 115 outputs the signal of a channel CH2.

Also, the multiplexer 115 may selectively outputs the signal of channel CH1 or CH2 according to the selection signal of the user interface 112, which indicates an enable signal and/or a disable signal.

Thus, the 2D to 3D conversion device displays an image with stereoscopic effect by way of either partial or full screen conversion, so that the conversion device is more flexible and provides more convenience to the user.

According to the device and the method for 2D to 3D conversion disclosed in the embodiments of the disclosure, a 2D image is converted into a 3D image by way of partial conversion. A portion of the 2D image displays stereoscopic effect, and other portion of the 2D image displays planar effect based on predetermined depth data. Since the viewer may view a 3D image and at the same time read the text data of a 2D image, the visual effect is thus enhanced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A two dimension (2D) to three dimension (3D) conversion device, comprising:
    a data receiver used for receiving 2D image data;
    a user interface used for displaying a preview frame and for assigning a predetermined window in response to a user selection on the preview frame, the predetermined window demarcating an image range of the 2D image data;
    a depth map generator used for generating a depth map according to the 2D image data and the predetermined window, wherein the depth map comprises depth data of the 2D image data; and
    an image converter used for converting the 2D image data into 3D image data according to the depth data of the depth map and the predetermined window.

2. The 2D to 3D conversion device according to claim 1, further comprising:
    a multiplexer used for selectively outputting the 2D image data or the 3D image data under control of the user interface.

3. The 2D to 3D conversion device according to claim 1, wherein the depth map generator judges whether a portion of the 2D image data is within the predetermined window, and generates corresponding depth data according to the judgment.

4. The 2D to 3D conversion device according to claim 3, wherein if the portion of the 2D image data is judged as outside the predetermined window, the depth map generator generates predetermined depth data.

5. The 2D to 3D conversion device according to claim 4, wherein the predetermined depth data is planar depth data.

6. A 2D to 3D conversion method, comprising:
    receiving 2D image data by a 2D to 3D conversion device;
    displaying a preview frame and assigning a predetermined window by the 2D to 3D conversion device in response to a user selection on the preview frame, wherein the predetermined window demarcates an image range of the 2D image data;
    generating a depth map by the 2D to 3D conversion device according to the 2D image data and the predetermined window, wherein the depth map comprises depth data of the 2D image data; and
    converting the 2D image data into 3D image data by the 2D to 3D conversion device according to the depth data of the depth map and the predetermined window.

7. The 2D to 3D conversion method according to claim 6, further comprising:
    selectively outputting the 2D image data or the 3D image data by the 2D to 3D conversion device.

8. The 2D to 3D conversion method according to claim 6, wherein, the step of generating the depth map comprises:
    judging by the 2D to 3D conversion device whether a portion of the 2D image data is within the predetermined window, and generating corresponding depth data according to the judgment.

9. The 2D to 3D conversion method according to claim 8, wherein the step of generating the depth map comprises:
    generating predetermined depth data by the 2D to 3D conversion device if the portion of the 2D image data is judged as being outside the predetermined window.

10. The 2D to 3D conversion method according to claim 9, wherein, the predetermined depth data is planar depth data.

11. A 2D to 3D conversion method, comprising:
    receiving 2D image data;
    converting a first portion of the 2D image data into 3D image data, wherein selection of the first portion of the 2D image data which is to be converted is responsive to a user selection on a displayed preview frame; and
    outputting the 3D image data and a second portion of the 2D image data other than the first portion of the 2D image data.

12. The 2D to 3D conversion method according to claim 11, wherein the step of outputting the second portion of the 2D image data other than the first portion of the 2D image data comprises:
    converting the second portion of the 2D image data other than the first portion of the 2D image data into another 3D image generated according to predetermined depth data; and
    outputting the another 3D image.

13. The 2D to 3D conversion method according to claim 12, wherein the predetermined depth data is planar depth data.

14. A 2D to 3D conversion device, comprising:

a data receiver used for receiving 2D image data;

a user interface used for displaying a preview frame and for assigning a first portion of the 2D image data, wherein selection of the first portion of the 2D image data is responsive to a user selection on the preview frame;

a depth map generator used for generating a depth map of the 2D image data; and an image converter used for converting the first portion of the 2D image data into 3D image data according to the depth map, and outputting the 3D image data and a second portion of the 2D image data other than the first portion of the 2D image data.

15. The 2D to 3D conversion device according to claim 14, wherein, the image converter converts the second portion of the 2D image data other than the first portion of the 2D image data into another 3D image according to predetermined depth data, and outputs the another 3D image.

16. The 2D to 3D conversion device according to claim 15, wherein, the predetermined depth data is planar depth data.

* * * * *